United States Patent
Balasubramanian (10) Patent No.: US 12,165,492 B1
(45) Date of Patent: Dec. 10, 2024

(54) DISINFECTANT MONITORING DEVICE, SYSTEM, AND METHOD

(71) Applicant: Cox Communications, Inc., Atlanta, GA (US)

(72) Inventor: Jaiganesh Balasubramanian, Peachtree City, GA (US)

(73) Assignee: Cox Communications, Inc., Atlanta, GA (US)

( * ) Notice: Subject to any disclaimer, the term of this patent is extended or adjusted under 35 U.S.C. 154(b) by 104 days.

(21) Appl. No.: 17/889,772

(22) Filed: Aug. 17, 2022

(51) Int. Cl.
| | |
|---|---|
| *G08B 3/10* | (2006.01) |
| *G01S 13/88* | (2006.01) |
| *G06K 19/07* | (2006.01) |
| *G08B 7/06* | (2006.01) |
| *G08B 21/24* | (2006.01) |
| *H02S 20/00* | (2014.01) |
| *H04N 5/33* | (2023.01) |

(52) U.S. Cl.
CPC ............ *G08B 21/245* (2013.01); *G01S 13/88* (2013.01); *G06K 19/0723* (2013.01); *G08B 7/06* (2013.01); *H02S 20/00* (2013.01); *H04N 5/33* (2013.01)

(58) Field of Classification Search
CPC ......... G08B 21/245; G08B 7/06; G01S 13/88; G06K 19/0723; H02S 20/00; H04N 5/33
See application file for complete search history.

(56) References Cited

U.S. PATENT DOCUMENTS

| | | | |
|---|---|---|---|
| 8,237,558 B2 | 8/2012 | Seyed Momen et al. | |
| 8,294,584 B2 | 10/2012 | Plost | |
| 9,170,148 B2 | 10/2015 | Bayley et al. | |
| 10,332,382 B2 | 6/2019 | Thyroff | |
| 11,017,654 B2 | 5/2021 | Trapani | |
| 11,288,945 B2 | 3/2022 | Kolavennu et al. | |
| 2011/0234598 A1* | 9/2011 | Scarola ................ | G08B 21/245 345/440.1 |
| 2019/0362616 A1* | 11/2019 | Hermann ............. | G08B 21/245 |
| 2022/0079394 A1* | 3/2022 | Murphy ................. | A47K 10/36 |
| 2023/0068765 A1* | 3/2023 | Ali ...................... | H04W 52/281 |

\* cited by examiner

*Primary Examiner* — An T Nguyen
(74) *Attorney, Agent, or Firm* — Merchant & Gould P.C.

(57) ABSTRACT

Aspects of the present disclosure provide systems, methods, and disinfectant monitoring devices that may be utilized to overcome technical limitations associated with conventional hand hygiene compliance systems, but are not so limited. A hand hygiene monitoring system includes a disinfectant monitoring device comprising a soap or disinfectant dispenser that includes one or more sensors including an accelerometer, a radar sensor, and/or a passive infrared (PIR) sensor. The PIR and/or radar sensor can be used to detect a number of people located at a site of the soap dispenser and the accelerometer can be used to determine whether soap has been dispensed. The hand hygiene monitoring system is configured to activate one of a display and a sound device present on each individual who has not used the soap dispenser and/or output compliance or non-compliance data.

20 Claims, 7 Drawing Sheets

DISINFECTANT MONITORING DEVICE, SYSTEM, AND METHOD

BACKGROUND

Hospital Acquired Infections (HAI) and/or Surgical Site Infections (SSI) are infections caused by virus, bacteria and other environmental factors acquired within hospitals or other medical treatment facilities. It is estimated that HAI and SSI infections cost the healthcare industry nearly $40 billion annually. HAI and SSI infections can be transmitted in multiple ways, including, but not limited to, surface contamination, airborne particulates and aspiration. HAI and SSI infections can be reduced by following strict procedures, including procedures regarding decontamination practices, hand-hygiene/antisepsis procedures, and other procedures.

Hand-hygiene compliance monitoring systems and apparatuses can be utilized in homes, daycares, schools, restaurants, and health care facilities including hospitals. In some cases, hand washing compliance is a metric that hospitals and other facilities track and report. Conventionally, there are several methods of gathering hand washing compliance data. These methods are often ineffective, inaccurate, costly, and/or hard to install and maintain. For example, the "secret shopper" method is one of the most common methods of gathering hand washing compliance data. In the "secret shopper" method, personnel are hired to periodically monitor hand-hygiene compliance of staff by being physically present in, e.g., a hospital room to monitor which health care professional uses the disinfectant dispenser to wash their hands. This method can be inaccurate due to human error, and the presence of a monitoring person may modify staff behavior.

Another conventional compliance method utilizes a real time location system (RTLS), where staff are tracked through an infrastructure of location beacons and anchors. This system, aside from being expensive, can be inaccurate, as the system only ensures that the staff person has passed through the vicinity of a washing station, but not that they actually washed their hands. Thus, a technical solution is needed to improve conventional monitoring and compliance associated with infection control procedures such as hand-hygiene compliance and monitoring.

SUMMARY

Aspects of the present disclosure provide systems, methods, and disinfectant monitoring devices that may be utilized to overcome technical limitations associated with conventional hand hygiene compliance systems, but are not so limited. According to an aspect, a hand hygiene monitoring system includes a disinfectant monitoring device comprising a soap or disinfectant dispenser that includes one or more sensors including an accelerometer, a radar sensor, and/or a passive infrared (PIR) sensor. According to one aspect, the PIR and/or radar sensor can be used to detect a number of people located at a site of the soap dispenser and the accelerometer can be used to determine whether soap has been dispensed. The hand hygiene monitoring system is configured to activate one of a display and a sound device present on each individual who has not used the soap dispenser and/or output compliance or non-compliance data.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the present disclosure.

BRIEF DESCRIPTION OF THE DRAWINGS

Further features, aspects, and advantages of the present disclosure will become better understood by reference to the following figures, wherein like reference numbers indicate like elements throughout the several views.

DETAILED DESCRIPTION

Aspects of the present disclosure provide systems, methods, and devices that may be utilized to overcome technical limitations associated with conventional monitoring and compliance associated with infection control procedures such as hand-hygiene compliance and monitoring of soap or disinfectant dispensing, but are not so limited. In one aspect, a technical solution is provided via a system that monitors hand washing using a soap dispenser (also referred to as a disinfectant dispenser) at a site. The method includes using one or more sensors of a disinfectant monitoring device as part of determining how many people complied by dispensing soap or disinfectant to wash hands. As described below, the disinfectant monitoring device may be manufactured as a soap dispenser product or manufactured separately and coupled with an existing soap dispenser product. The method of one aspect includes detecting a first number of people present at a site, monitoring a use of the soap dispenser, determining a second number of people who used the soap dispenser based on the monitoring the use of the soap dispenser, comparing the first number and the second number, and when the first number is larger than the second number, determining a third number of people present at the site that have not used the soap dispenser, the third number being a difference between the first number and the second number. Once the one or more sensors of the disinfectant monitoring device have been used to make a determination, compliance data may be stored locally or in a cloud computing network and/or notifications or alarms provided to non-complying users.

In an example of the above aspect, the method further includes using the disinfectant monitoring device or a wireless interface or receiver device to signal, when the first number is larger than the second number, that at least one of the third number of people have not used the soap dispenser. In another example, the method is further configured to identify at least one of the third number of people who have not used the soap dispenser by detecting an identification device on each of the third number of people, and correlating the identification device to an identity of each of the third number of people. The method is further configured to activate at least one of a display and a sound device present on each of the identified third number of people.

According to an aspect, a method is configured to determine a first number of people at a site by using at least one of a radar sensor and an infrared (IR) sensor of the disinfectant monitoring device to detect the first number of people. For example, based on a detection signal output from the IR sensor, the method is configured to determine how many people entered the site within a time frame and, based on the detection signal output by the radar sensor, determine how many people are present at the site within a time frame.

In another aspect, monitoring the use of a soap dispenser includes using one or more sensors as part of determining whether a person is within proximity of the soap dispenser and determining whether an amount of soap has been dispensed. For example, determining whether a person is within proximity of the soap dispenser includes detecting a signal emitted by a passive infrared (PIR) sensor coupled to or integrated with a soap dispenser. In another example, determining whether an amount of soap has been dispensed includes detecting a signal output by an accelerometer coupled to or integrated with the soap dispenser. As described above, the disinfectant monitoring device can be configured as the soap dispenser. In yet another example, determining the second number of people includes correlating the amount of soap that has been dispensed with a determination that the person is within proximity of the soap dispenser.

In another aspect, the technology relates to a hand washing monitoring system that includes a disinfectant monitoring device comprising a soap dispenser located at a site, a proximity sensor configured to sense one or more persons within proximity of the soap dispenser at the site, an accelerometer configured to detect whether soap is dispensed from the soap dispenser, and a radar sensor configured to determine how many people are present at the site.

As an example, the proximity sensor is configured to detect a proximity that includes a distance of a foot or less, the accelerometer is integrated or coupled within the soap dispenser, the radar sensor is integrated or coupled to the soap dispenser, and/or each of the people present at the site is equipped with an identifying device, such as a badge having a radio frequency (RF) tag. In another example, the proximity sensor is configured to identify the one or more persons in proximity thereof based on the identifying device of the one or more persons. In yet another example, the hand washing monitoring system further includes one of a display and a sound device configured to signal whether one or more of the people present in the site have not washed their hands. In a further example, the hand washing monitoring system further includes a solar cell coupled to the soap dispenser and configured to power the soap dispenser from ambient light in the site. In a further example, the hand washing monitoring system included a cloud network that includes a compliance database for storing compliance data.

In another aspect, a hand washing monitoring system includes a soap dispenser located at a site, one or more detectors or sensors configured to detect people present at the site and within proximity of the soap dispenser, a processor operatively coupled to the soap dispenser and to the plurality of detectors, and a memory coupled to the processor, the memory storing instructions that, when executed by the processor, perform a set of operations. In various examples, the set of operations include determining, via a first detector, a first number of people present in the site, monitoring, via the processor, a use of the soap dispenser, determining, via a second detector, a second number of people who used the soap dispenser, comparing, via the processor, the first number and the second number, and determining, when the second number is smaller than the first number, a third number of people present in the site that have not used the soap dispenser, the third number being a difference between the first number and the second number.

According to an example, the set of operations further includes signaling, when the second number is smaller than the first number, that the third number of people have not used the soap dispenser, and/or identifying each of the third number of people who have not used the soap dispenser. In a further example, the set of operations further includes identifying each of the third number of people by detecting an identification device on each of the third number of people, and correlating, via the processor, the identification device to an identity of each of the third number of people.

In a further example, the set of instructions further includes activating one of a display and a sound device present on each of the identified third number of people. In another example, the first detector includes one of a radar sensor and an IR sensor, and/or the second detector includes an accelerometer. In yet another example, the set of instructions includes monitoring the use of the soap dispenser by determining, via the first detector, whether a person is within proximity of the soap dispenser, and determining, via the second detector, whether an amount of soap has been dispensed.

Figure 1:
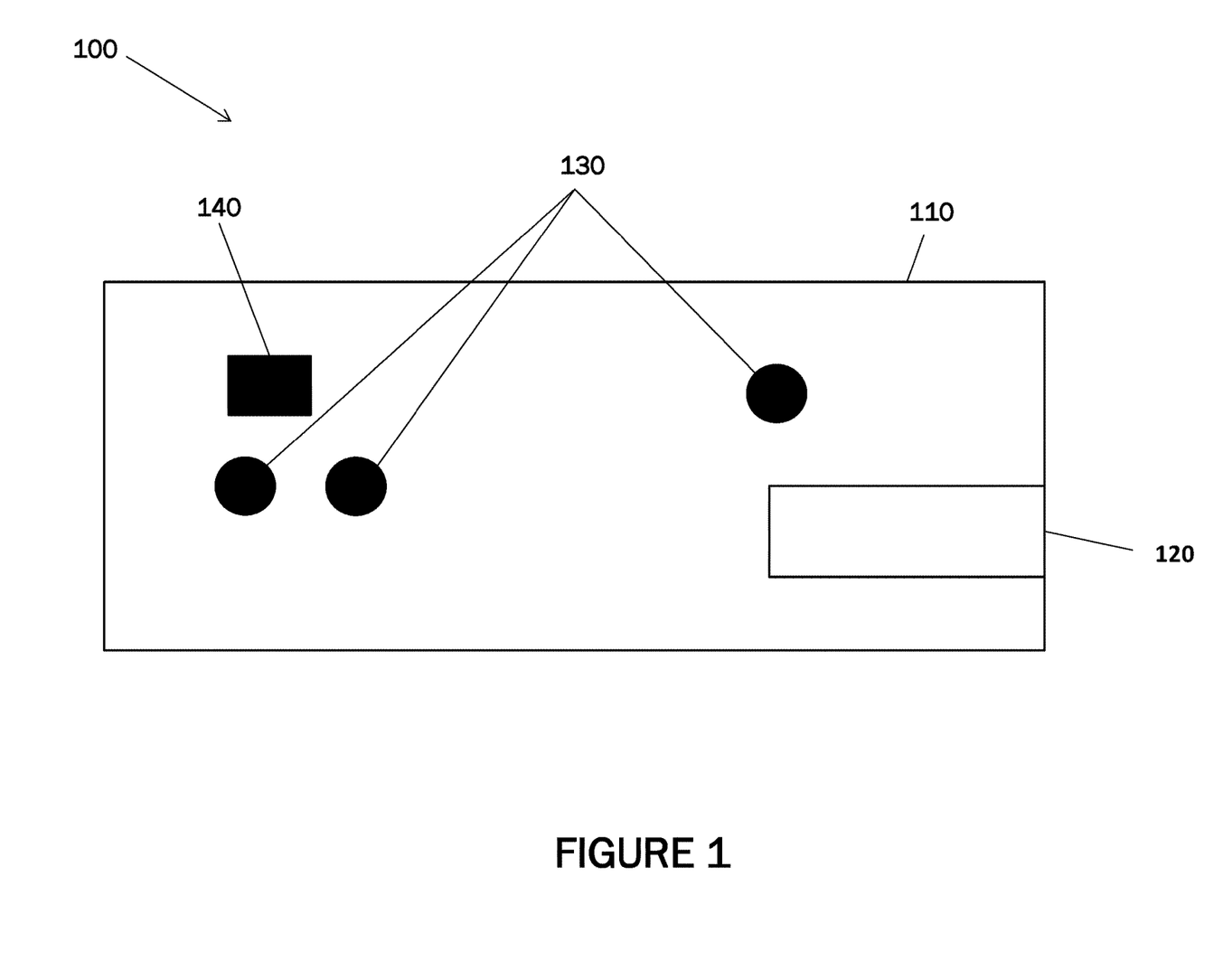
FIG. 1 is an illustration of a hand washing monitoring system, in accordance with various examples of the disclosure.

FIG. 1 is a schematic view of hand washing monitoring system 100, in accordance with various examples of the disclosure. In FIG. 1, the system 100 may include a site 110. In various examples, the site 110 may be, e.g., a hospital room, a laboratory, or other site where hand washing or sanitizing is a desired and advantageous feature. In the case of a hospital environment, the site 110 may include a patient bed 120 where a patient may be present, as well as a plurality of healthcare professionals 130. In various examples, the site 110 also includes a disinfectant or hand hygiene monitoring device also referred to as disinfectant dispenser or soap dispenser 140.

Soap dispenser 140 may be powered by a battery (not shown) which can be charged by an onboard solar or light-based charger. In various examples, although the dispenser 140 is referred to as a soap dispenser, the dispenser 140 may be configured to dispense soap in liquid or foam form, detergent, shampoo, disinfectant, cleaner, or any other agent capable of cleaning and/or disinfecting a person's body part such as, e.g., a person's hands. In the example illustrated in FIG. 1, three people such as, e.g., healthcare professionals 130, are also present in the room 110. Two of the healthcare professionals 130 are close to the soap dispense 140, and a third healthcare professional 130 is closer to the hospital bed 120. In various examples, the system 100 is advantageously configured to monitor the hand washing of each of the healthcare professionals 130 at the soap dispenser 140, e.g., when a patient is present in the hospital bed 120, as described below.

Hand washing monitoring system 100 can include a real-time locating system (RTLS) for locating equipment and personnel. RTLS includes RTLS receiver devices located throughout a building including room 110, RTLS badges or tags worn by personnel, and/or tags attached to or embedded with equipment. As personnel and equipment move about a facility equipped with RTLS devices, tags are configured to transmit signals to RTLS receivers at each location. Tags can include a unique tag identifier that can be correlated to identify an individual or equipment to which a tag has been assigned. Each receiver can be configured to transmit a unique identifier with a detected tag identifier to determine a particular location, such as a patient room, equipment room, hallway, etc. RTLS system can refer to a database, based on transmissions from RTLS devices of associated identifiers to determine locations of personnel and equipment.

Figure 2:
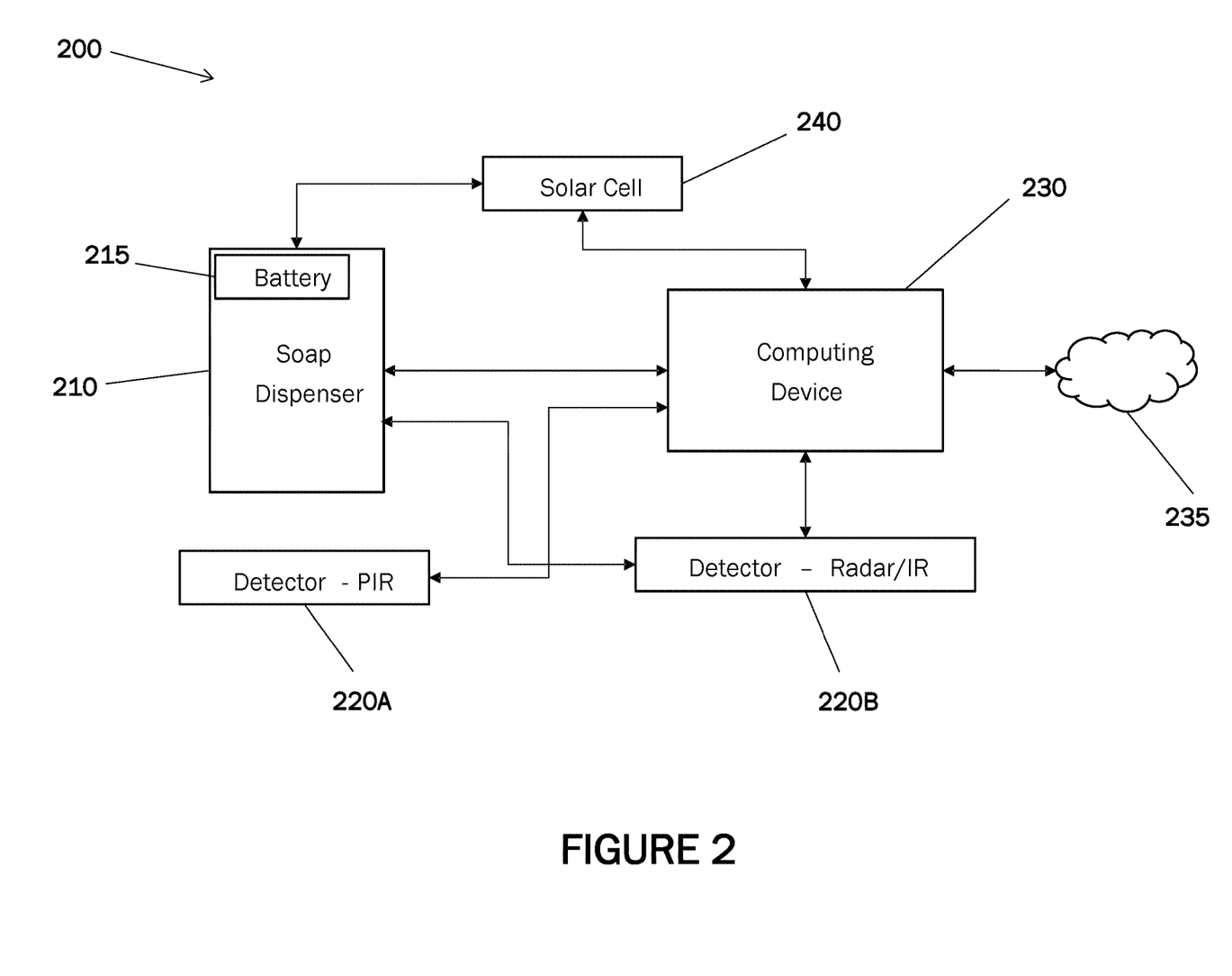
FIG. 2 is a schematic diagram of a hand washing monitoring system, in accordance with various examples of the disclosure.

FIG. 2 is a schematic diagram of a hand washing monitoring system 200, in accordance with various examples of the disclosure. According to an aspect, hand washing monitoring system 200 includes a soap dispenser 210 or 140, one or more detectors or sensors 220A and 220B coupled to the soap dispenser 210, and a computing device 230 configured to control operation of the one or more detectors 220A and 220B and of the soap dispenser 210. Soap dispenser 210 may be powered by a battery 215. Computing device 230 may be or include a processing device similar to the computing device 700 discussed below with respect to FIG. 7.

In various examples, the computing device 230 may store compliance information of caregivers who did not wash their hands at the soap dispenser 210 during a visit to a patient's room in a database at, e.g., the cloud 235, or other remote and centralized location. In yet another example, at least one of the detectors 220A and 220B may be, e.g., integrated within the soap dispenser 210, or may be appended to or coupled with the soap dispenser 210, although other configurations may be included in this example, as long as the detectors 220A and 220B are capable of detecting features of the environment surrounding the soap dispenser 210.

In various aspects, the one or more detectors 220A and 220B may also include, e.g., a passive infrared (PIR) detector 220A coupled to the soap dispenser 210, or integrated with the soap dispenser 210. For example, the PIR detector 220A may include two pyroelectric sensors, each pyroelectric sensor being configured to detect heat energy in the surrounding environment thereof. The two sensors may be placed next to each other, and when the signal differential between the two sensors changes such as, e.g., if a person comes in proximity to the sensors, then the PIR detector 220A may emit a signal indicating that a person is in proximity thereof. In other examples, the PIR detector 220A is configured to detect that soap is being dispensed at the soap dispenser 210.

In an example, the one or more detectors 220A and 220B may communicate with the soap dispenser 210 via, e.g., BLUETOOTH or other communication interface. For example, the PIR detector 220A may be configured to determine how many people are within a close proximity, or within the vicinity, of the soap dispenser 210. In another example, the PIR detector 220A may be coupled to the computing device 230. As the PIR detector 220A is coupled to the computing device 230, information from the PIR detector 220A may be communicated to the computing device 230. In an example, the soap dispenser 210 and the one or more detectors 220A and 220B may communicate with the computing device 230 via, e.g., BLUETOOTH or other communication interface.

According to one aspect, the vicinity of the soap dispenser 210 within which the PIR detector 220A can detect a number of people present may be a distance of about a foot or less. Detector 220B can be configured as a radar sensor and/or an infrared (IR) sensor. In examples, radar sensor 220B may be configured to detect how many people are present in the site such as, e.g., the site 110 discussed above, during a given time frame. As the radar sensor 220B is coupled to the computing device 230, output from the radar sensor 220B may be communicated to the computing device 230.

IR sensor 220B may be configured to detect how many people have entered the location such as, e.g., the site 110 discussed above, during a given time frame. For example, the IR sensor 220B may be located at the entrance of the site such as, e.g., the site 110 discussed above, and can be configured to determine how many people have entered the room during a time frame. IR sensor 220B can also detect how many people have left the site 110 during the time frame. As the IR sensor 220B is coupled to the computing device 230, information from the IR sensor 220B may be communicated to the computing device 230. In other examples, the computing device 230 may combine the information provided by the PIR detector 220A and by the radar sensor and/or IR sensor 220B to determine how many people, from the people present in the site 110, have not washed their hands using the soap dispenser 140.

In other examples, the hand washing monitoring system 200 also includes a solar cell 240 coupled to or integrated with the soap dispenser 210. For example, the solar cell may also be coupled to the computing device 230, and may be configured to power the soap dispenser 210 by generating power from ambient light emitted from light sources or the sun at a location of the soap dispenser 210, such as ambient light within the site 110.

Figure 3A:
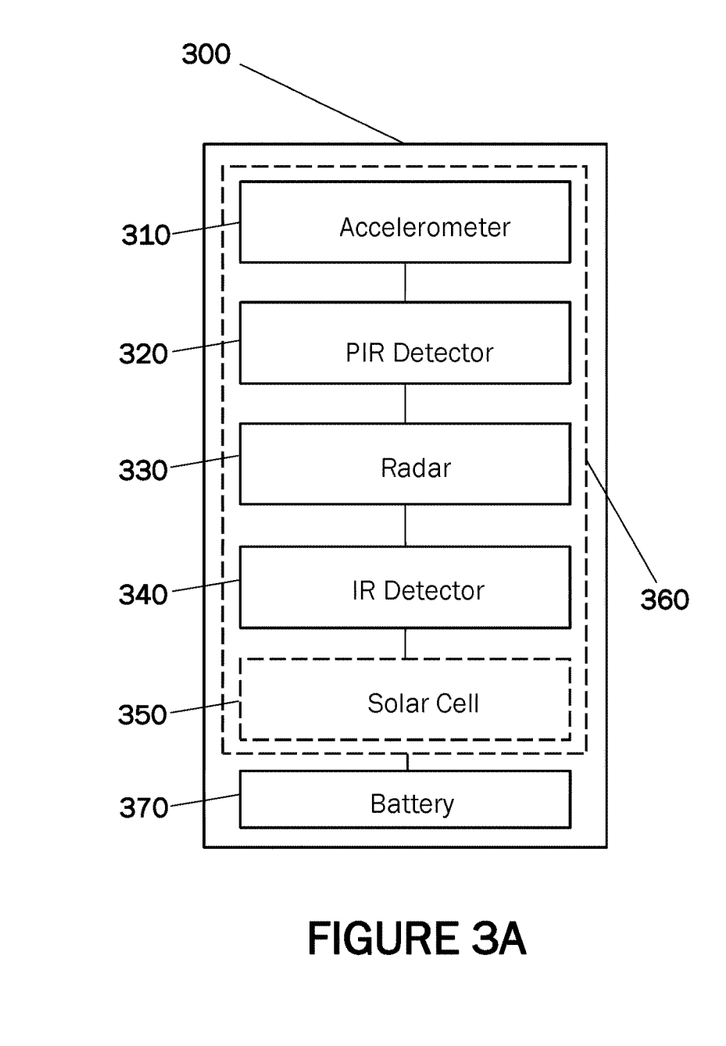
FIGS. 3A-3B are illustrations of a disinfectant dispenser configuration, in accordance with various examples of the disclosure.
Figure 3B:
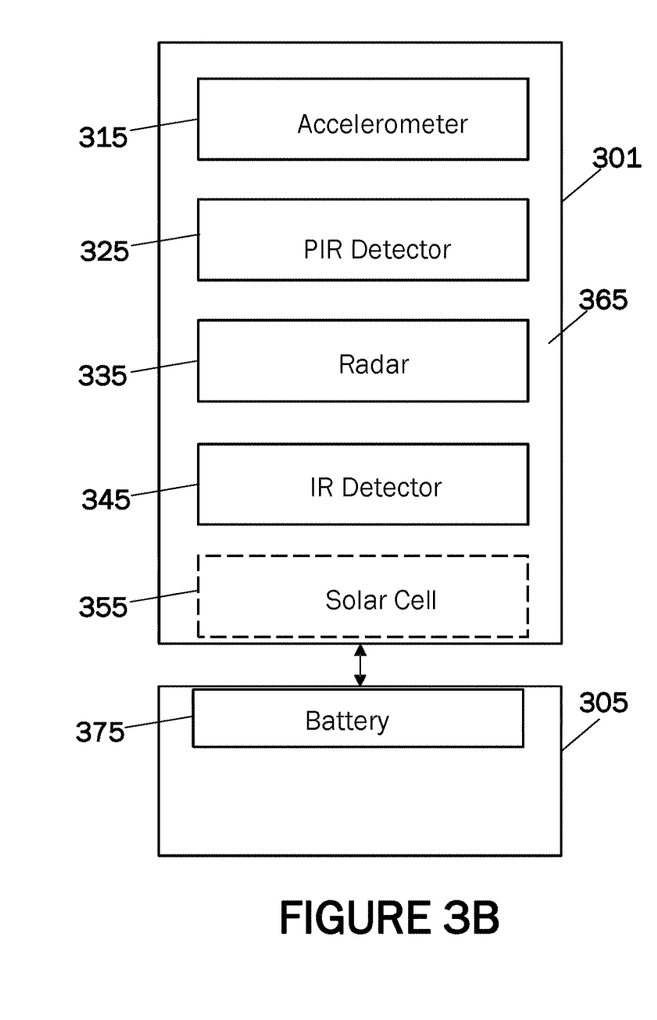

FIGS. 3A-3B are illustrations of disinfectant monitoring device configurations (not to scale), in accordance with various examples of the disclosure. FIG. 3A illustrates an integrated disinfectant monitoring device (also referred to as disinfectant or soap dispenser) 300 that includes a sensor suite 360 including, e.g., an accelerometer 310, a PIR detector 320, a radar sensor 330, and IR detector 340, and optionally a solar cell 350, integrated with the disinfectant monitoring device 300. In other examples, the sensor suite 360 may not include the solar cell 350 but may be instead coupled to an exterior solar cell. In other examples, the sensor suite 360 may include a battery (not shown) to provide power thereto. In various examples, the solar cell 350 may be outside of the disinfectant monitoring device 300. In various examples, the accelerometer 310 may be integrated with moving dispensing components of disinfectant monitoring device 300 so as to sense whether soap or disinfectant is or has been dispensed. In various examples, the disinfectant monitoring device 300 may also include a battery 370 configured to power the operation of the disinfectant monitoring device 300.

FIG. 3B illustrates an accessory disinfectant monitoring device 301 that is coupled to a conventional soap dispenser 305. According to an aspect, BLUETOOTH, wired, or other communication interface may be used to provide a communication interface between sensor suite and conventional soap dispenser 305. In the configuration, the soap dispenser 305 and accessory disinfectant monitoring device 301 can be offered and sold as part of a kit or as separate compatible components. In various examples, the sensor suite 365 may include one or more of an accelerometer 315, a PIR detector 325, a radar sensor 335, an IR detector 345, and a solar cell 355.

In other examples, the sensor suite 365 may not include the solar cell 355 but may be instead coupled to an exterior solar cell. In other examples, the sensor suite 365 may include a battery (not shown) to provide power thereto. In various examples, the accelerometer 310 may be outside of the soap dispenser 300 (as part of an accessory coupled to soap dispenser 305) but positioned so as to sense whether the soap dispenser 300 is dispensing soap or disinfectant by detecting movement of a dispensing actuator or at the point of emission of the soap out of the soap dispenser 305. In various examples, the soap dispenser 305 and/or disinfectant monitoring device 301 can also include a battery 375 configured to power the operation of each.

While not shown, each of integrated disinfectant monitoring device 300 and disinfectant monitoring device 301 can also include one or more wireless interfaces, processors, and memory for storing and/or providing sensor data and compliance determination output to other components/systems. For example, a first wireless interface, such as a BLUETOOTH interface for example, can be used to detect badges or other radio frequency identifiers as part of identifying caregivers and other users near or within proximity to a disinfectant device. As further example, a second wireless interface, such as a WIFI or other wireless interface can be used to convey detection and/or compliance information to a compliance database or other reporting component. Radar sensors 330, 335 can be configured with different power and antenna capabilities, such as omnidirectional or directed beam shaping antennas. Radar sensors 330, 335 can also be configured to discriminate to identify different individuals attending to a patient and the patient, so that the patient is not included in a hand hygiene compliance determination. In some implementations, sensors, detectors, wireless interfaces, processors, memory, etc. can be manufactured as part of a silicon on a chip (SOC) product.

Figure 4:
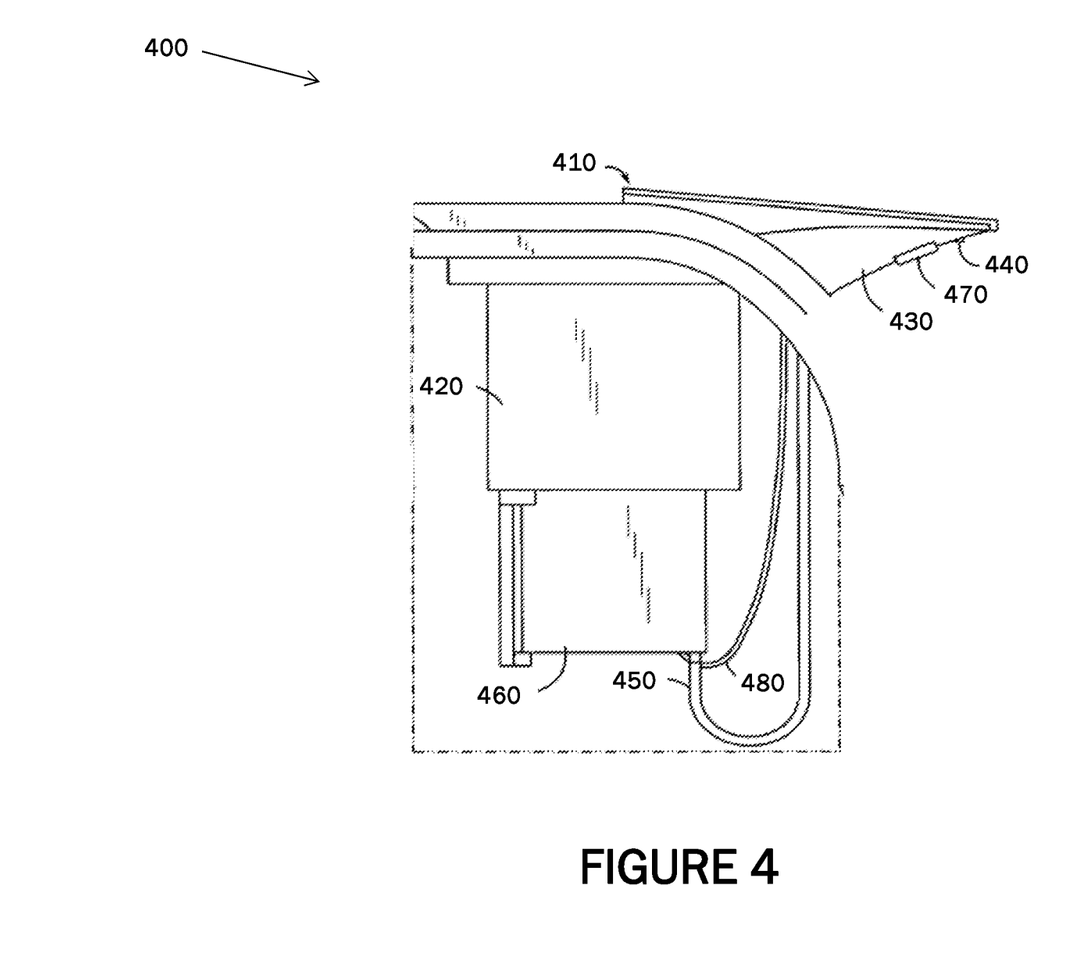
FIG. 4 is an illustration of a disinfectant dispensing mechanism, in accordance with various examples of the disclosure.

FIG. 4 is an illustration of a soap dispensing mechanism 400, in accordance with various examples of the disclosure. In FIG. 4, the soap dispensing mechanism 400 includes a soap dispenser 410 coupled to a soap container or vessel 420, a spout 430, and a nozzle 440 formed in the spout 430 through which soap such as, e.g., liquid soap, may be dispensed. In various examples, soap may be moved from the vessel 420 to the nozzle 440 through tubing 450. In examples, a pump 460 is configured to move the soap from the vessel 420 along the tubing 450 to the nozzle 440.

In various examples, a detector 470 such as, e.g., an infrared sensor or PIR detector similar to the PIR detector 220A discussed above with respect to FIG. 2, may be mounted to the spout 430 and adjacent the nozzle 440. Detector 470 may be configured to detect the presence of a user's hands beneath the nozzle 440. In an example of automatic soap dispensing, when the detector 470 detects the presence of a person in the vicinity of the soap dispenser 410, a control signal may be provided to the pump 460 along transmission line 480. Accordingly, the detection of a user's hand(s) beneath the nozzle 440 may cause activation of the pump 460 to move soap from the vessel 420 to the nozzle 440 and into the user's hand(s). Other control methods may be used to control how much and for how long the pump 460 moves soap to the nozzle 440.

In addition, the detector 470 may record the number of people who have come within a vicinity, e.g., within a foot or less, of the soap dispensing mechanism 400, and communicate this information to a computing device such as, e.g., the computing device 230 discussed above with references to FIG. 2. In various examples, the detector 470 may use a communication interface to transmit the information regarding the number of people who have come within the vicinity of the mechanism 400, and the number of people who have washed their hands, over a period of time, to a centralized database (not shown). Accordingly, a record of the number of people present in the vicinity of the mechanism 400 who have washed their hands may be compared for different periods of time such as, e.g., day and night, winter and summer, and the like.

Figure 5:
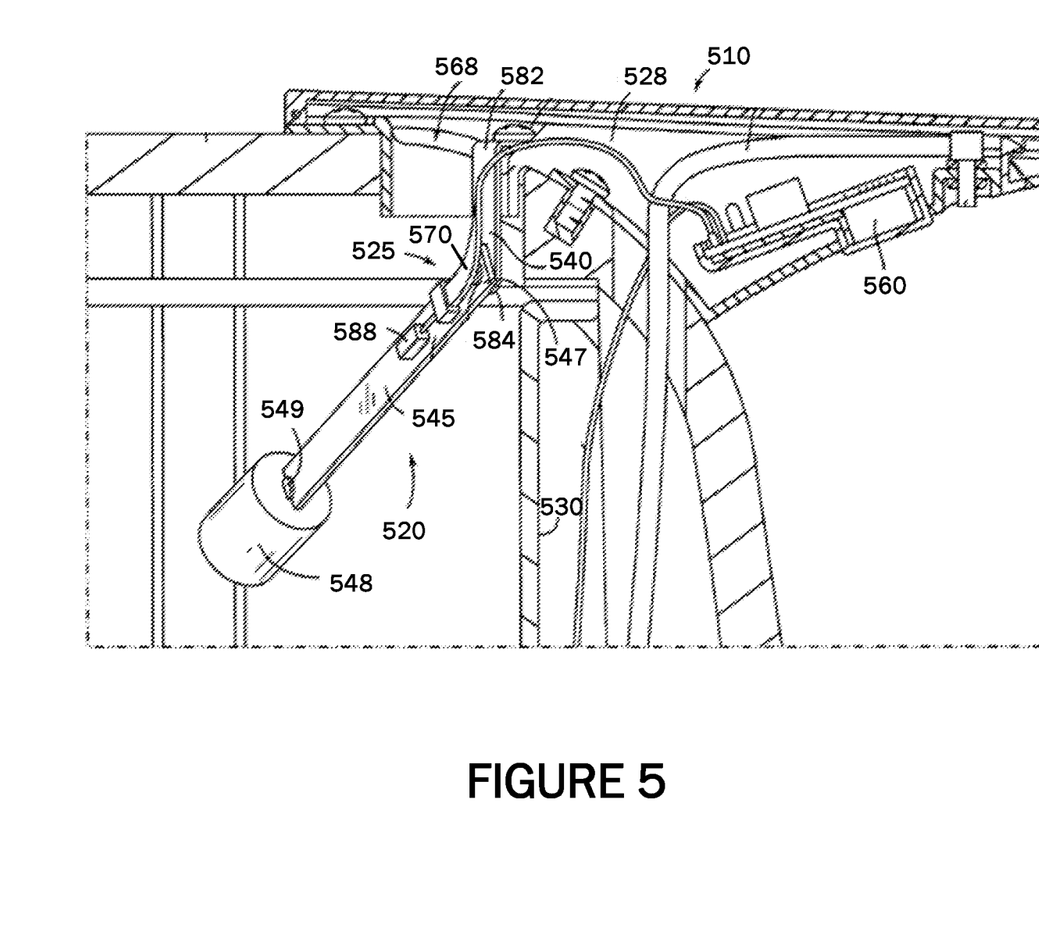
FIG. 5 is an illustration of a disinfectant dispensing mechanism, in accordance with various examples of the disclosure.

FIG. 5 is an illustration of a soap dispensing assembly 510, in accordance with various examples described herein. In various examples, delivery of soap from the soap dispenser assembly 510 may be monitored via, e.g., an accelerometer 588 (e.g., accelerometer 310 or 315). For example, the soap dispenser assembly 510 includes a fluid or fill level sensor assembly 520 operative to measure the soap level in the soap vessel, e.g., liquid soap vessel, 530. The fill level sensor assembly 520 includes an arm 525, which may include an interconnected linkage including a stationary link 540 and a pivoting link 545 pivotably coupled to the stationary link 540. In an example, the pivoting link 545 has a first end 547 pivotably coupled to the stationary link 540 and a second end 549 to which a float 548 is coupled. The float 548 may be or include a material having a density less than soap, or liquid soap, and may ride generally about the top surface of the soap. In an example, the float 548 may be formed of a non-absorbent material, such as, e.g., a hard plastic.

In various examples, the stationary link 540 extends generally along a vertical axis, and may be mounted to the spout 528. The stationary link 540 has a planar upper end 582 that is attached to the spout 528 adjacent the fill opening 568 so that the vertical portion of the stationary link 540 sits generally against an inner wall of the fill opening 568. The stationary link 540 has a lower end 584 that is pinned to the pivoting link 545. In examples, attached to an exterior surface of the pivoting link 545 is the accelerometer 588 that provides an output signal with a voltage that changes as the volume of soap in the vessel 530 changes. This output signal is transmitted to the sensor board 560 via wire ribbon 570.

As the soap level in the vessel 530 changes, the position of the float 548 will also change. Since the float 548 is supported by the soap in the vessel 530, as the volume of soap in the vessel changes, the voltage output of the accelerometer 588 also changes. It will be appreciated that the accelerometer 588 may provide a digital or an analog output communicated to a computing device such as, e.g., the computing device 230 discussed above with respect to FIG. 2. For purposes of calibrating the accelerometer 588, the volume of soap in the vessel 530 required to support the float 548 so that the pivoting link 545 is generally perpendicular to the stationary link 540 may be considered to be a baseline volume, and thus the stationary link 540, in effect, may form a fixed point of reference against which volume changes in the vessel 530 may be measured.

In various examples, the accelerometer 588 is configured to detect the displacement of a precision inertial mass constrained to move along a single axis (the accelerometer axis) when acted upon by an external force, and to generate an output proportional to the displacement of that mass. The displacement of the mass is a function of the magnitude of the external force, and of the orientation of the external force vector relative to the accelerometer axis. When the external force vector is aligned with the accelerometer axis, the displacement of the inertial mass may be a maximum, and conversely when the external force vector is perpendicular to the accelerometer axis, the inertial mass displacement may be a minimum, or zero.

Thus, the accelerometer 588, rigidly mounted to pivoting link 545, may generate an output that varies predictably as the soap level in vessel 530 changes. The external force acting on the accelerometer 588 is the force due to gravity. Ignoring small variations due to elevation and the earth's curvature, this force is constant in both magnitude and direction, and its orientation is fixed relative to stationary link 540. Because the accelerometer 588 is rigidly mounted to the pivoting link 545, the orientation of the accelerometer axis is fixed relative to the link 545. As the soap level in vessel 530 changes, the angle of pivoting link 545 with respect to stationary link 540 changes, and the orientation of the accelerometer axis relative to the external force vector therefore changes in a manner substantially or completely defined by the trigonometric relationship among the several axes. Because the displacement of the accelerometer inertial mass is a function of the magnitude of the external force, which is constant, and the orientation of the external force vector relative to the accelerometer axis, which is trigonometrically related to the soap level in vessel 530, and the accelerometer output is proportional to this displacement, the accelerometer output varies predictably as the soap level in vessel 530 changes.

In various examples, the fill level sensor 520 may also be used to detect an overflow or overfilled condition. For example, if the output of the accelerometer 588 corresponds to an angular position above the horizontal, i.e., a negative angle, this would signal that the fill level in the soap vessel 530 is such that the float 548 has caused the pivoting link 545 to move past a horizontal position. Assuming that the horizontal position corresponds to a maximum desired fill level, any angle above the horizontal may thus indicate that the soap level is above desired levels, which may signal an overflow of soap in the soap vessel 530. This may be used to signal to a service person that a maximum fill level has been reached to avoid overfilling of the soap vessel 530.

Figure 6:
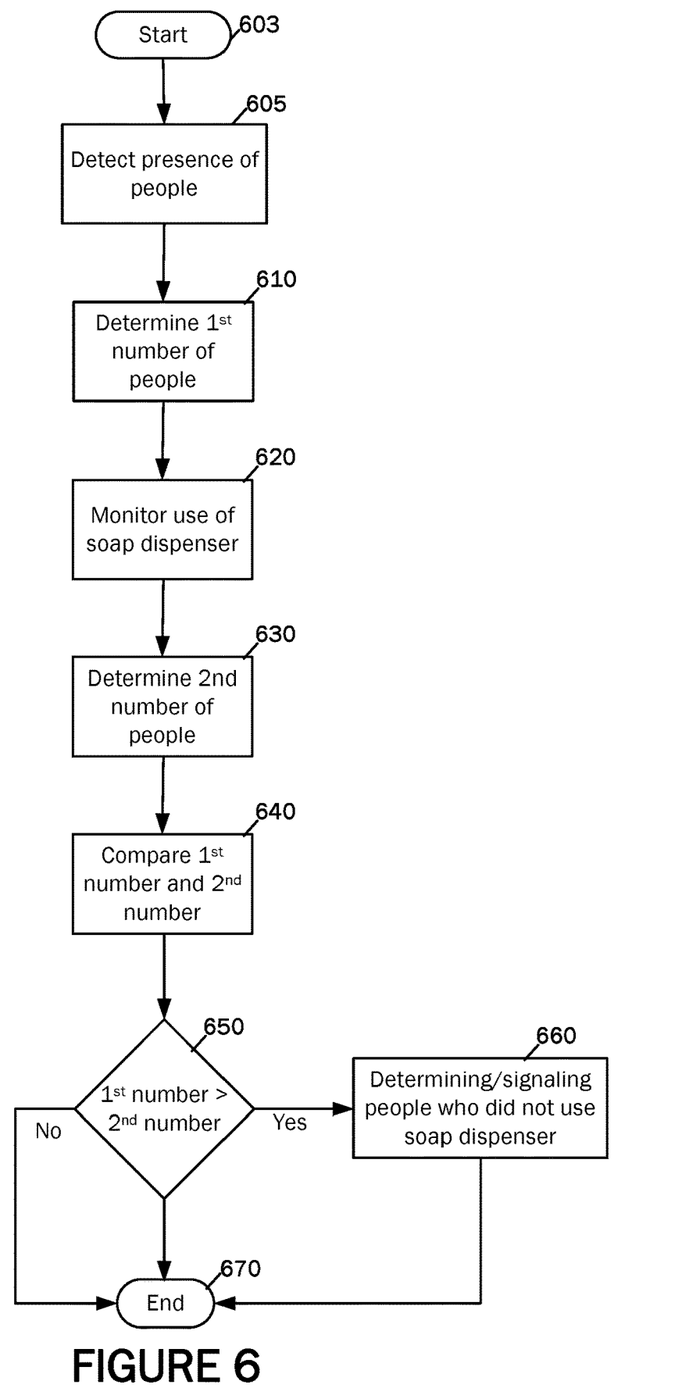
FIG. 6 is a flow chart depicting an example process for monitoring hand washing using a disinfectant dispenser in a location, in accordance with various examples of the disclosure.

FIG. 6 is a flow chart depicting an example method 600 for monitoring hand washing using a disinfectant monitoring device (also referred to as a disinfectant or soap dispenser) at a location or site, in accordance with various examples of the disclosure. In FIG. 6, the method 600 starts at 603 and proceeds to 605, during which the presence of people in the site is detected. For example, the presence of people may be detected via PIR detector 320 or 325 that is integrated with the disinfectant monitoring device or located by, e.g., a door of the site. According to an aspect, as part of conserving battery power, method 600 powers on radar sensor 330, 335 after detecting presence of people with a different sensor (e.g., PIR detector 320, 325 or IR detector 340, 345) at 605. In various examples, at 605 method 600 may be a trigger to the rest of the operations of method 600. For example, if no person is detected to be present in the site, then none of the operations 610-660 are performed by method 600. If at least one person is detected to be present at the site, then operations 610-660 may be performed.

With continuing reference to FIG. 6, method 600 continues to operation 610 which includes determining that people are present in the site and determining a first number of people present at the site. The site may be, e.g., a hospital room or other location where it is advantageous or mandatory for every person present to wash their hands. If the site is a hospital room, the patient may be exempted from having to wash their hands. For example, determining the first number of people can be achieved by detecting a signal from a radar sensor (radar sensor 330 or 335), or from an IR sensor (IR detector 340 or 345), within a given time frame. In an example, the radar sensor and/or the IR sensor may be coupled as part of an accessory or kit to a soap dispenser and to, e.g., a computing device, as described in detail above. In other examples, the radar sensor and/or the IR sensor may be integrated with the disinfectant monitoring device. In the case of using an IR sensor, the IR sensor may be used to detected how many people have entered the location within the given time frame. In the case of using a radar sensor, the radar sensor may be used to detect how many people are present in the location during the given time frame.

In various examples, at 620 method 600 includes monitoring the use of a soap dispenser that is present in the site. In various examples, monitoring the use of soap during at 620 may be triggered by the determination at 610, that people are present at the site. As an example, if no person is detected to be at the site during at 610, then method 600 may not execute 620. For example, monitoring the use of soap may be performed by determining whether one or more persons are within a vicinity of the disinfectant monitoring device, and by determining whether an amount of soap has been dispensed.

In an example, determining whether a person is within the vicinity of the disinfectant monitoring device may be performed by detecting a signal emitted by a sensor such as, e.g., a PIR detector, an IR detector, or a radar sensor, that is coupled to standalone soap dispenser, or as part of an integrated soap dispenser that includes the disinfectant monitoring device. For example, information from the PIR detector, IR detector, or radar, may be transmitted or received via, e.g., BLUETOOTH or other communication interface, to other detectors or to a database such as, e.g., a centralized database.

In another example, determining whether an amount of soap has been dispensed may be performed by detecting a signal emitted by an accelerometer integrated within, or otherwise coupled to, a soap dispenser. For example, the accelerometer may be coupled to the soap dispensing mechanism of the soap dispensing device, and may be configured to determine whether some amount of soap has been dispensed. In other examples, the determined first number of people during at 610, the determined number of people in front of the soap dispenser, and the determination of an amount of soap that has been dispensed by the soap dispenser may be submitted to a computing device. For example, the computing device may be similar to the computing device 230 discussed above.

At 630 method 600 includes determining a second number of people, the second number of people representing a number of people who dispensed soap based on the monitoring of the soap dispenser. For example, determining the second number of people may be performed by correlating the amount of soap that has been dispensed with a determination that the person is within the vicinity of the soap dispenser. For example, correlating the amount of soap that has been dispensed to the number of people present may include determining an average amount of soap typically dispensed to one person, and dividing the total amount of soap or disinfectant that has been dispensed by the average amount to obtain a number of people who have washed their hands. In an example, the vicinity may be a distance of a foot or less. In other examples, the determined second number of people during at 630 may also be submitted to a computing device such as, e.g., the computing device 230 discussed above.

At 640 method 600 includes comparing the first number and the second number. In an example, comparing the first number and the second number may be performed by a computing device such as, e.g., the computing device 230 discussed above. If the first number is not greater than the second number at 650, method 600 exits at 670. When the first number is larger than the second number at 650 method 600 can use this difference to indicate that at least one person present in the site such as, e.g., the hospital room, has not used the soap dispenser.

Accordingly, at 660 method 600 includes a determination of a third number of people present in the location, the third number representing the people that have not used or dispensed soap from the soap dispenser. In various examples, the third number of the people that have not used the soap dispenser, and/or their identities, may be stored in a compliance database at, e.g., the cloud, or other remote and centralized location. For example, the third number is the difference between the first number and the second number. In other examples, when the first number is larger than the second number, at 660 method 600 includes signaling that at least one of the people have not used the soap dispenser.

According to an aspect, when the first number is larger than the second number, at 660 method 600 also includes identifying at least one of the people who have not used the soap dispenser. For example, identifying one of the people who have not used the soap dispenser may be performed by detecting an identification device (e.g., badge or tag) on each of the third number of people, and correlating the identification device to an identity of each of the third number of people. For example, correlating the identification device to the identity of a person may include transmitting a signal from the identification device that is worn or carried by the person to a database such as, e.g., a centralized database on the cloud, the signal including a reference of the identification device, and associating the transmitted reference of the identification device to an identity of the person wearing the identification device.

For example, the remote database may include the identities of all personnel of a healthcare facility as well as the references of the identification devices associated with each member of the personnel. Accordingly, when a reference for an identification device is received at the database, the identity of the person wearing or carrying the identification device may be ascertained by associating the reference to the identity of the person in the database. In various examples, when the people who have not used the soap dispenser have been identified, at 660 method 600 can also include activating a display)(e.g., an LED light on a badge, a smartphone alert displayed on a screen, a tablet alert displayed on a screen, etc.) and/or activating a sound device (e.g., a buzzer, a smartphone speaker, a tablet speaker, etc.) on each of the identified people who have not used the soap dispenser in order to prompt them to use the soap dispenser. As a result, any person who is present in the location and who did not use the soap dispenser may be identified and/or prompted to use the soap dispenser.

In various examples, a record of the determination performed during operation 660 may be saved in a centralized database such as, e.g., a database stored on the cloud. In examples, the centralized database may be accessible by the detectors in operation during operations 610-630, and may also be accessible remotely from, e.g., an administrator or manager. For example, the record of the determination performed during operation 660 may be saved in the centralized database over a period of time. Method 600 then ends at 670.

Figure 7:
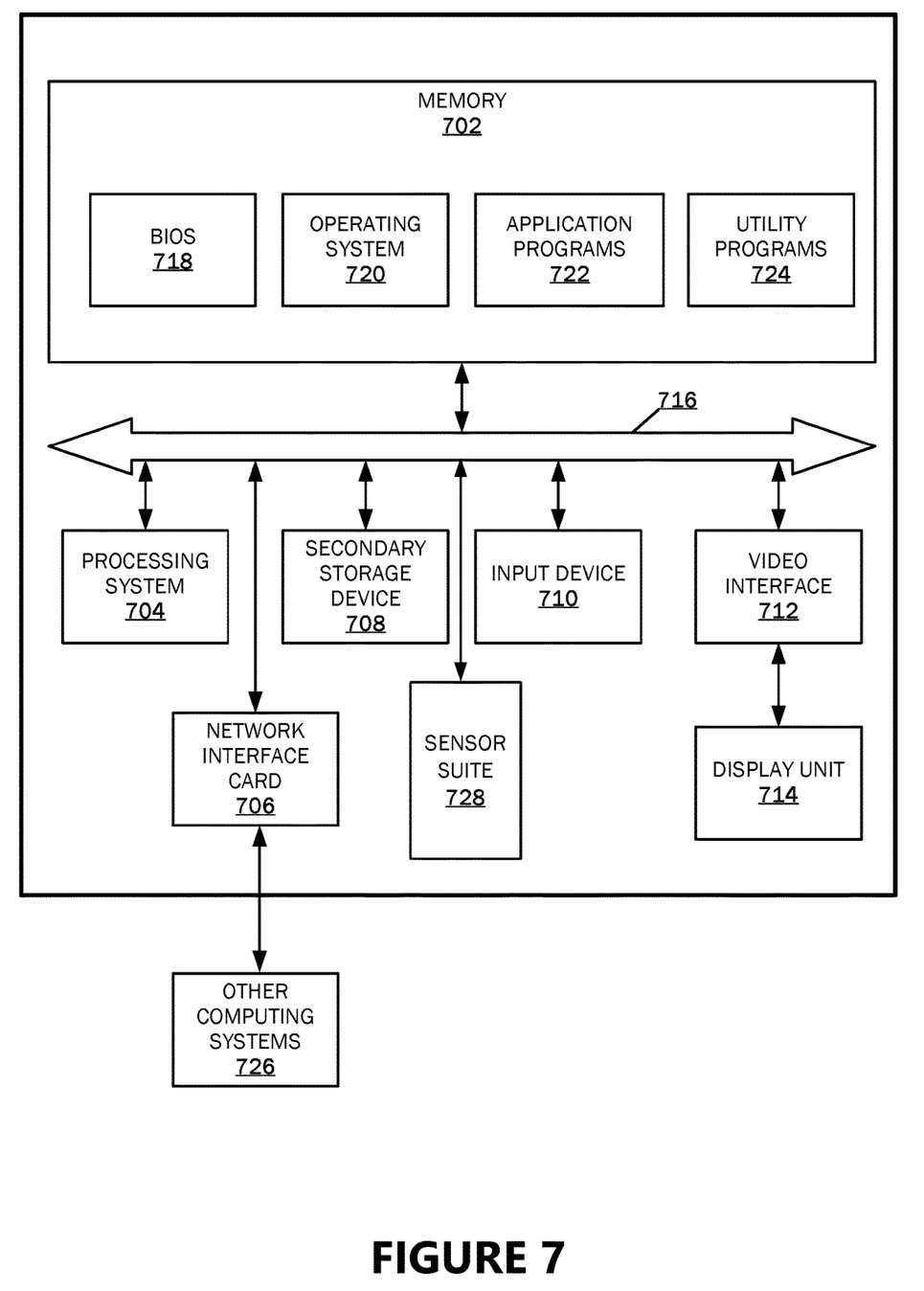
FIG. 7 depicts a block diagram of a computing device in which examples described here can be implemented.

FIG. 7 is a block diagram illustrating example physical components of a computing device 700 or system with which embodiments may be practiced as part of providing a soap or disinfectant dispensing monitoring service. For example, the computing device 700 may be included as part of a disinfectant monitoring device as discussed above with respect to the computing device 230 illustrated in FIG. 2. The computing device 700 may also be part of a centralized database located remotely from the soap dispenser at a given site, or residing remotely on the cloud. It should be appreciated that in other embodiments, different hardware components other than those illustrated in the example of FIG. 7 may be used.

Computing devices may be implemented in different ways in different embodiments. For instance, in the example of FIG. 7, the computing device 700 includes a processing system 704, memory 702, a network interface card 706 (wired and/or wireless, cellular type, 802.11 type, etc.), a secondary storage device 708, an input device 710, a video interface 712, a display unit 714, and a communications medium or BUS 716. In other embodiments, the computing device 700 may be implemented using more or fewer hardware components (e.g., a video interface, a display unit, or an input device) or in combination with other types of computer systems and applications 726. In other examples, the computing device 700 may include, or be coupled to, a sensor suite 728. For example, the sensor suite 728 may be similar to the sensor suite 360 or 365 discussed above with respect to FIGS. 3A and 3B.

The memory 702 includes one or more computer-readable storage media capable of storing data and/or computer-executable instructions. Memory 702 may store the computer-executable instructions that, when executed by a processor of the processing system 704, cause allocation and/or reallocation operations as part of load balancing internal connections. In various embodiments, the memory 702 is implemented in various ways. For example, the memory 702 can be implemented as various types of computer-readable storage media. Example types of computer-readable storage media include, but are not limited to, solid state memory, flash memory, dynamic random access memory (DRAM), double data rate synchronous dynamic random access memory (DDR SDRAM), DDR2 SDRAM, DDR3 SDRAM, read-only memory (ROM), reduced latency DRAM, electrically-erasable programmable ROM (EEPROM), and other types of devices and/or articles of manufacture that store data.

The term computer-readable storage medium may also refer to devices or articles of manufacture that store data and/or computer-executable instructions readable by a computing device. The term computer-readable storage media encompasses volatile and nonvolatile, removable and non-removable media implemented in various methods or technologies for storage and retrieval of information. Such information can include data structures, applications, computer-executable instructions, or other data.

The processing system 704 includes one or more processing units, which may include tangible integrated circuits that selectively execute computer-executable instructions. In various embodiments, the processing units in the processing system 704 are implemented in various ways. For example, the processing units in the processing system 704 can be implemented as one or more processing cores. In this example, the processing system 704 can comprise one or more microprocessors. In another example, the processing system 704 can comprise one or more separate microprocessors. In yet another example embodiment, the processing system 704 can comprise Application-Specific Integrated Circuits (ASICs) that provide specific functionality. In yet another example, the processing system 704 provides specific functionality by using an ASIC and by executing computer-executable instructions.

The computing device 700 may be enabled to send data to and receive data from a communication network via a network interface card 706. In different embodiments, the network interface card 706 is implemented in different ways, such as an Ethernet interface, a token-ring network interface, a fiber optic network interface, a wireless network interface (e.g., cellular, WI-FI, Wi-Max, etc.), or another type of network interface. The network interface may allow the device to communicate with other devices, such as over a wireless network in a distributed computing environment, a satellite link, a cellular link, and comparable mechanisms. Other devices may include computer device(s) that execute communication applications, storage servers, and comparable devices.

The secondary storage device 708 includes one or more computer-readable storage media, and may store data and computer-executable instructions not directly accessible by the processing system 704. That is, the processing system 704 performs an I/O operation to retrieve data and/or computer-executable instructions from the secondary storage device 708. In various embodiments, the secondary storage device 708 can be implemented as various types of computer-readable storage media, such as by one or more magnetic disks, magnetic tape drives, CD-ROM discs, DVD-ROM discs, BLU-RAY discs, solid state memory devices, and/or other types of computer-readable storage media.

The input device 710 enables the computing device 700 to receive input from a user. Example types of input devices include, but are not limited to, keyboards, mice, trackballs, stylus input devices, key pads, microphones, joysticks, touch-sensitive display screens, and other types of devices that provide user input to the computing device 700.

The video interface 712 outputs video information to the display unit 714. In different embodiments, the video interface 712 is implemented in different ways. For example, the video interface 712 is a video expansion card. In another example, the video interface 712 is integrated into a motherboard of the computing device 700. In various embodiments, the display unit 714 can be an LCD display panel, a touch-sensitive display panel, an LED screen, a projector, a cathode-ray tube display, or another type of display unit. In various embodiments, the video interface 712 communicates with the display unit 714 in various ways. For example, the video interface 712 can communicate with the display unit 714 via a Universal Serial Bus (USB) connector, a VGA connector, a digital visual interface (DVI) connector, an S-Video connector, a High-Definition Multimedia Interface (HDMI) interface, a DisplayPort connector, or another type of connection.

The communications medium 716 facilitates communication among the hardware components of the computing device 700. In different embodiments, the communications medium 716 facilitates communication among different components of the computing device 700. For instance, in the example of FIG. 7, the communications medium 716 facilitates communication among the memory 702, the processing system 704, the network interface card 706, the secondary storage device 708, the input device 710, and the video interface 712. In different embodiments, the communications medium 716 is implemented in different ways, such as a PCI bus, a PCI Express bus, an accelerated graphics port (AGP) bus, an InfiniBand® interconnect, a serial Advanced Technology Attachment (ATA) interconnect, a parallel ATA interconnect, a Fiber Channel interconnect, a USB bus, a Small Computing system Interface (SCSI) interface, or another type of communications medium.

The memory 702 stores various types of data and/or software instructions. For instance, in the example of FIG. 7, the memory 702 stores a Basic Input/Output System (BIOS) 718, and an operating system 720. The BIOS 718 includes a set of software instructions that, when executed by the processing system 704, cause the computing device 700 to boot up. The operating system 720 includes a set of software instructions that, when executed by the processing system 704, cause the computing device 700 to provide an operating system that coordinates the activities and sharing of resources of the computing device 700. The memory 702 also stores one or more application programs 722 or program code that, when executed by the processing system 704, cause the computing device 700 to provide applications (e.g., application 128) to users. The memory 702 also stores one or more utility programs 724 that, when executed by the processing system 704, cause the computing device 700 to provide utilities to other software programs.

Embodiments may be used in combination with any number of computer systems, such as in server environments, desktop environments, laptop or notebook computer systems, multiprocessor systems, micro-processor based or programmable consumer electronics, networked PCs, mini computers, main frame computers and the like. Embodiments may be utilized in various distributed computing environments where tasks are performed by remote processing devices that are linked through a communications network in a distributed computing environment, and where program code may be located in local and/or remote memory storage (e.g., memory and/or disk(s)).

All system components described herein may be communicatively coupled via any method of network connection known in the art or developed in the future including, but not limited to wired, wireless, modem, dial-up, satellite, cable modem, Digital Subscriber Line (DSL), Asymmetric Digital Subscribers Line (ASDL), Virtual Private Network (VPN), Integrated Services Digital Network (ISDN), X.25, Ethernet, token ring, Fiber Distributed Data Interface (FDDI), IP over Asynchronous Transfer Mode (ATM), Infrared Data Association (IrDA), wireless, WAN technologies (T1, Frame Relay), Point-to-Point Protocol over Ethernet (PPOE), etc. including any combination thereof.

Aspects, for example, are described above with reference to block diagrams and/or operational illustrations of methods, systems, and computer program products according to embodiments. The functions/acts noted in the blocks can occur out of the order as shown in any flowchart or described herein. For example, two processes shown or described in succession can in fact be executed substantially concurrently or the blocks can sometimes be executed in the reverse order, depending upon the functionality/acts involved.

While certain embodiments have been described, other embodiments may exist. Furthermore, although embodiments have been described as being associated with data stored in memory and other storage mediums, data may also be stored on or read from other types of computer-readable storage media. Further, the disclosed processes may be modified in any manner, including by reordering and/or inserting or deleting a step or process, without departing from the embodiments.

The foregoing description has been presented for the purposes of illustration and description. It is not intended to be exhaustive or to limit the embodiments to the precise forms disclosed. Many modifications and variations are possible in light of the above teaching. It is intended that the scope of the invention be limited not with this detailed description, but rather by the claims appended hereto.

What is claimed is:

1. A method of monitoring hand washing using a soap dispenser at a site, the method comprising:
    determining, via a first detector coupled to a processor, a first number of people present at the site;
    monitoring, via a second detector coupled to the processor, a use of the soap dispenser;
    determining, via the processor, a second number of people who used the soap dispenser based on the monitoring the use of the soap dispenser;
    comparing, via the processor, the first number and the second number;
    when the first number is larger than the second number, determining, via the processor, a third number of people present at the site that have not used the soap dispenser, the third number being a difference between the first number and the second number; and
    identifying, via the processor, at least one of each person who used the soap dispenser and each person who did not use the soap dispenser.

2. The method of claim 1, further comprising:
    using a proximity sensor or an IR sensor to detect that a person is near or using the soap dispenser;
    using a radar sensor to detect how many people are near the soap dispenser; and
    confirming, via the processor, one or more identities of the people who are near the soap dispenser.

3. The method of claim 1, further comprising identifying, via the processor, at least one of the third number of people who have not used the soap dispenser.

4. The method of claim 3, wherein identifying each of the third number of people comprises:
    detecting an identification device on each of the third number of people; and
    correlating the identification device to an identity of each of the third number of people.

5. The method of claim 3, further comprising activating one of a display and a sound emitter present on each of the identified third number of people.

6. The method of claim 1, further comprising:
    determining the first number of people by detecting a signal from an IR detector comprises determining how many people entered the room within a time frame or determining the first number of people by detecting a signal from a radar sensor comprises determining how many people are present in the room within a time frame; and
    determining the second number of people comprises correlating the amount of soap that has been dispensed with a determination that a person of the second number is within proximity of the soap dispenser.

7. The method of claim 1, wherein monitoring the use of the soap dispenser comprises:
    determining whether a person is within proximity of the soap dispenser; and
    determining whether an amount of soap has been dispensed.

8. The method of claim 7, further comprising:
    determining whether a person is within proximity of the soap dispenser comprises detecting a signal emitted by a PIR detector coupled to the soap dispenser; and
    determining whether an amount of soap has been dispensed comprises detecting a signal emitted by an accelerometer coupled to the soap dispenser.

9. A system for monitoring hand washing using a soap dispenser at a site, the system comprising:
    a first detector configured to determine a first number of people present at the site;
    a second detector configured to monitor a use of the soap dispenser; and
    a processor connected to the first detector and the second detector, wherein the processor is configured to:
        determine a second number of people who used the soap dispenser based on the monitoring the use of the soap dispenser;
        compare the first number and the second number;
        determine, when the first number is larger than the second number, a third number of people present at the site that have not used the soap dispenser, the third number being a difference between the first number and the second number; and
        identify at least one of each person who used the soap dispenser and each person who did not use the soap dispenser.

10. The system of claim 9, further comprising:
    a proximity sensor or an IR sensor to detect that a person is near or using the soap dispenser;
    a radar sensor to detect how many people are near the soap dispenser; and
    wherein the processor is further configured to confirm one or more identities of the people who are near the soap dispenser.

11. The system of claim 9, wherein the processor is further configured to identify at least one of the third number of people who have not used the soap dispenser.

12. The system of claim 11, wherein the processor being configured to identify each of the third number of people comprises the processor being configured to:
    detect an identification device on each of the third number of people; and
    correlate the identification device to an identity of each of the third number of people.

13. The system of claim 11, wherein the processor is further configured to activate one of a display and a sound emitter present on each of the identified third number of people.

14. The system of claim 9, wherein:
    the first detector is configured to determine the first number of people by detecting a signal from an IR detector or a radar sensor, the first detector is configured to determine how many people entered the room within a time frame; and
    the processor is configured to determine the second number of people by correlating the amount of soap that has been dispensed with a determination that a person of the second number is within proximity of the soap dispenser.

15. The system of claim 9, wherein the second detector being configured to monitor the use of the soap dispenser comprises the second detector being configured to:
    determine whether a person is within proximity of the soap dispenser; and
    determine whether an amount of soap has been dispensed.

16. A non-transitory computer-readable medium that stores a set of instructions which when executed perform a method comprising:
    determining, via a first detector coupled to a processor, a first number of people present at the site;
    monitoring, via a second detector coupled to the processor, a use of the soap dispenser;

determining, via the processor, a second number of people who used the soap dispenser based on the monitoring the use of the soap dispenser;

comparing, via the processor, the first number and the second number;

determining, via the processor, when the first number is larger than the second number, a third number of people present at the site that have not used the soap dispenser, the third number being a difference between the first number and the second number; and identifying, via the processor, at least one of each person who used the soap dispenser and each person who did not use the soap dispenser.

17. The non-transitory computer-readable medium of claim 16, further comprising:

using a proximity sensor or an IR sensor to detect that a person is near or using the soap dispenser;

using a radar sensor to detect how many people are near the soap dispenser; and confirming, via the processor, one or more identities of the people who are near the soap dispenser.

18. The non-transitory computer-readable medium of claim 16, further comprising identifying at least one of the third number of people who have not used the soap dispenser.

19. The non-transitory computer-readable medium of claim 18, wherein identifying each of the third number of people comprises:

detecting an identification device on each of the third number of people; and correlating the identification device to an identity of each of the third number of people.

20. The non-transitory computer-readable medium of claim 16, wherein monitoring the use of the soap dispenser comprises:

determining whether a person is within proximity of the soap dispenser; and determining whether an amount of soap has been dispensed.

* * * * *